United States Patent [19]
Katzir et al.

[11] Patent Number: 6,011,891
[45] Date of Patent: Jan. 4, 2000

[54] INFRARED-TRANSMITTING-FIBER-OPTIC-CABLE-BASED DEVICE FOR NON-CONTACT THERMOMETRY

[76] Inventors: Abraham Katzir, 15 Him, Afeka, 69696 Tel Aviv; Ophir Eyal, 6/17 Remez, 47272 Ramat Hasharon; Ari Derow, 45885 Salit, all of Israel

[21] Appl. No.: 08/844,547

[22] Filed: Apr. 18, 1997

[30]    Foreign Application Priority Data

Apr. 26, 1996  [IL]  Israel ........................................ 118050

[51] Int. Cl.⁷ ..................................................... G02B 6/16
[52] U.S. Cl. .......................... 385/123; 385/117; 385/141
[58] Field of Search ................................... 385/141, 144, 385/126, 127, 122, 123, 117

[56]              References Cited

U.S. PATENT DOCUMENTS

| | | | |
|---|---|---|---|
| 3,698,387 | 10/1972 | Moore et al. ............................ | 385/115 |
| 3,728,998 | 4/1973 | Heine ....................................... | 385/117 |
| 4,253,731 | 3/1981 | Anderson et al. ...................... | 385/142 |
| 4,335,713 | 6/1982 | Komiya ..................................... | 128/9 |
| 4,402,790 | 9/1983 | Lynn et al. .................................. | 201/1 |
| 5,076,653 | 12/1991 | Kayashima et al. ..................... | 385/123 |
| 5,167,235 | 12/1992 | Seacord et al. .......................... | 128/664 |
| 5,602,947 | 2/1997 | Neuberger ................................. | 385/31 |
| 5,709,829 | 1/1998 | Giacometti ............................... | 264/156 |
| 5,733,029 | 3/1998 | Monroe ..................................... | 385/117 |

*Primary Examiner*—John D. Lee
*Assistant Examiner*—Ellen E. Kang
*Attorney, Agent, or Firm*—Mark M. Friedman

[57]                ABSTRACT

An improved waveguide for an infrared thermometer, comprising a silver halide optical fiber cable of low transmission loss, a high aspect ratio, and a radially decreasing index of refraction. The transmission loss is low enough to enable the cable to be up to ten meters in length, thereby extending beyond the housing of the thermometer and being insertable in confined spaces such as an ear canal. The small cross sectional area and radially decreasing index of refraction of the cable make the field of view of the cable small enough to enable it to resolve targets as small as a portion of the human tympanic membrane, enabling the device to be used to measure the core temperature of humans and other organisms.

7 Claims, 5 Drawing Sheets

INFRARED-TRANSMITTING-FIBER-OPTIC-CABLE-BASED DEVICE FOR NON-CONTACT THERMOMETRY

FIELD AND BACKGROUND OF THE INVENTION

The present invention relates to an infrared thermometer, and, more particularly, to an infrared medical thermometer that receives infrared emission from the tympanic membrane via a narrow fiber optic cable with a radially varying index of refraction, thereby measuring core body temperature.

The core body temperature of a person or of a warm blooded animal reflects the state of his, her, or its health. Fevers of 1° C.–2° C. above normal are the body's normal response to infection. Higher temperatures, as in heat stroke or severe infection, can be rapidly fatal. Thus, measurement of core body temperature is an important medical diagnostic tool, particularly with patients, such as animals and young children, who cannot describe their symptoms verbally. The tragic consequences of misdiagnosing potentially fatal human diseases are obvious. Ignorance of dangerously elevated temperatures in valuable animals may have severe economic consequences, for example if the animals are race horses which have not been acclimated to hot and humid climates.

The classical way to measure core body temperature is by using a rectal thermometer. This requires more cooperation from the patient than often may be forthcoming. Some adult humans and many animals may regard the insertion of a foreign body in their rectums as an invasion of their privacy. In a clinic or hospital setting, routine use of a rectal thermometer invites the risk of transferring infectious body fluids among the patients if proper hygienic precautions are not taken. Thus, it would be highly advantageous to have a non-contact method of measuring core body temperature.

More localized temperature measurements may be diagnostic of localized infections, particularly infections of the middle ear. It is important to know which, if either, of a patient's two ears is infected, particularly if the therapy is to include myringotomy, which includes piercing the tympanic membrane and draining the fluid from the middle ear. Being able to clearly distinguish which of a patient's two tympanic membranes is hotter would make this diagnosis much easier, especially if the patient is too young to describe his or her symptoms verbally.

One promising non-contact method of measuring temperature is infrared thermometry. All material bodies emit electromagnetic radiation. The emission spectrum is described by Planck's law. Bodies at temperatures near ordinary room temperature have emission spectra that peak in the mid-infrared, at wavelengths around 10 microns. By the Stefan-Boltzmann law, the intensity of emission is proportional to the fourth power of the temperature. Thus, the temperature of an object can be measured by measuring its infrared emission, using any one of many sensors known to the art, such as thermopiles, pyroelectric sensors, bolometers, or active infrared sensors. Several such devices have been patented, for example, by Fraden (U.S. Pat. No. 5,368,038), Seacord et al. (U.S. Pat. No. 5,167,235), and Pompei (U.S. Pat. No. 5,445,158). These three patents are incorporated by reference for our purposes as if fully set forth herein. In these devices, infrared radiation from both the tympanic membrane and the walls of the ear canal are transmitted by a waveguide to an infrared sensor. These devices provide means for convenient non-contact body temperature measurement. However, they sense infrared radiation emitted both by the tympanic membrane and by the generally cooler ear canal. Therefore, they do not measure the true core body temperature, and do not have sufficient resolution to distinguish infected ears from uninfected ears. Pompei recognizes this problem, and advocates scanning the tympanic membrane, on the unverifiable assumption that the highest temperature thus measured is the true core body temperature.

There is thus a widely recognized need for, and it would be highly advantageous to have, a medical thermometer capable of non-contact measurement of core body temperature via measurement of tympanic membrane temperature alone, without interference by infrared emissions from the surrounding ear canal.

SUMMARY OF THE INVENTION

According to the present invention there is provided an improved waveguide for an infrared thermometer of the type in which an end of the waveguide receives mid-range infrared radiation from a target, wherein the improvement comprises: an optical instrument having a port, the end of the waveguide being inserted into the port.

According to the present invention, there is provided a method for measuring a temperature of a tympanic membrane within an ear canal, comprising the steps of: (a) inserting a distal end of a fiber optic cable into the ear canal; and (b) positioning the distal end of the fiber optic cable within a few millimeters of the tympanic membrane.

According to the present invention there is provided a device for measuring the temperature of a target on the basis of infrared radiation emitted by the target, comprising: (a) a waveguide for conducting the infrared radiation from the target, the waveguide having a distal end for receiving the infrared radiation from the target; (b) an optical instrument for observing a distance of the distal end of the waveguide from the target; and (c) a mechanism for positioning the distal end of the waveguide at a desired distance from the target.

Our improvement in infrared thermometry is an extension of a teaching of Seacord et al. They disclose the use of a fiber optic cable to conduct infrared radiation from the target to the infrared sensor. Their fiber optic cable is a bundle of many thin fibers. The fiber optic cable of the present invention is a single fiber with particularly advantageous physical and chemical properties.

In preferred embodiments of the present invention, the cable is made of crystalline silver halides, preferably a mixture of silver chloride and silver bromide, as described below. The cable is transparent to mid-range infrared radiation of wavelengths between 3 microns and 25 microns, with a transmission loss of less than 0.2 dB/meter at 10.6 microns. This low transmission loss means that, unlike Seacord et al.'s fiber bundle, the single fiber cable of the present invention transmits useable levels of infrared radiation over distances as great as 10 meters. Thus, the cable can extend outside the housing of the thermometer itself, and can be positioned within a few (1 to 5) millimeters of a confined target such as the human tympanic membrane. The cable can be fabricated with a diameter as small as 0.5 millimeters, thus being able to resolve the temperature of targets, such as the human tympanic membrane, whose size is on the order of several millimeters, without interference from infrared emission from other nearby bodies. The field of view of the optical fiber can be narrowed further by properly adjusting the radially decreasing index of refraction. A smaller field of view increases the spatial resolution of the measurement, because the fiber "sees" a smaller area of the target. The cable is flexible, insoluble in water, and stable with respect to decomposition by light. Unlike hollow waveguides, whose transmission and field of view are strongly dependent on their radii of curvature, the cable can be curved to relatively small radii of curvature without losing its advantages, because its transmission and field of view are practically independent of the radii of curvature. Unlike optical fibers made from other media transparent to mid-range infrared radiation, such as chalcogenide glasses and fluoride glasses, the cable is nontoxic and nonhygroscopic, which are very desirable properties in medical applications.

To make it easier to position the distal end of the cable near a small target, preferred embodiments of the present invention incorporate further means for observing the relative positions of the distal end and the target, and for moving the distal end relative to the target. In a preferred embodiment of the present invention intended for medical use, the distal end of the cable is movably inserted into the speculum of a conventional otoscope, so that a physician can look through the otoscope at the patient's ear canal and position the distal end of the cable within a few millimeters of a patient's tympanic membrane without rupturing the membrane.

It is to be understood that the preferred embodiments of the present invention described herein are exemplary, and are not intended to restrict the scope of the present invention. The fiber optic cable of the present invention may be made of suitable materials other that silver halides, for example, nonoxide glasses such as $AsS_3$ and $AsSe_3$, or metal fluoride glasses, such as $ZrF_4$. The optical instrument of the present invention may be any suitable instrument, for example, an endoscope or an operating microscope. Any suitable waveguide for mid-range infrared radiation, including a hollow waveguide, may be used with the optical instrument of the present invention. Finally, the device of the present invention is suitable for remote thermometry in general, and particularly in situations where there is no line of sight to the target.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a waveguide-based device, for infrared thermometry, that can be used for accurate measurements of the temperatures of relatively small targets, and of a method for its use. Specifically, the present invention can be used to measure the core body temperature of a person or an animal by measuring the temperature of the subject's tympanic membrane.

The principles and operation of infrared thermometry according to the present invention may be better understood with reference to the drawings and the accompanying description.

Figure 1:
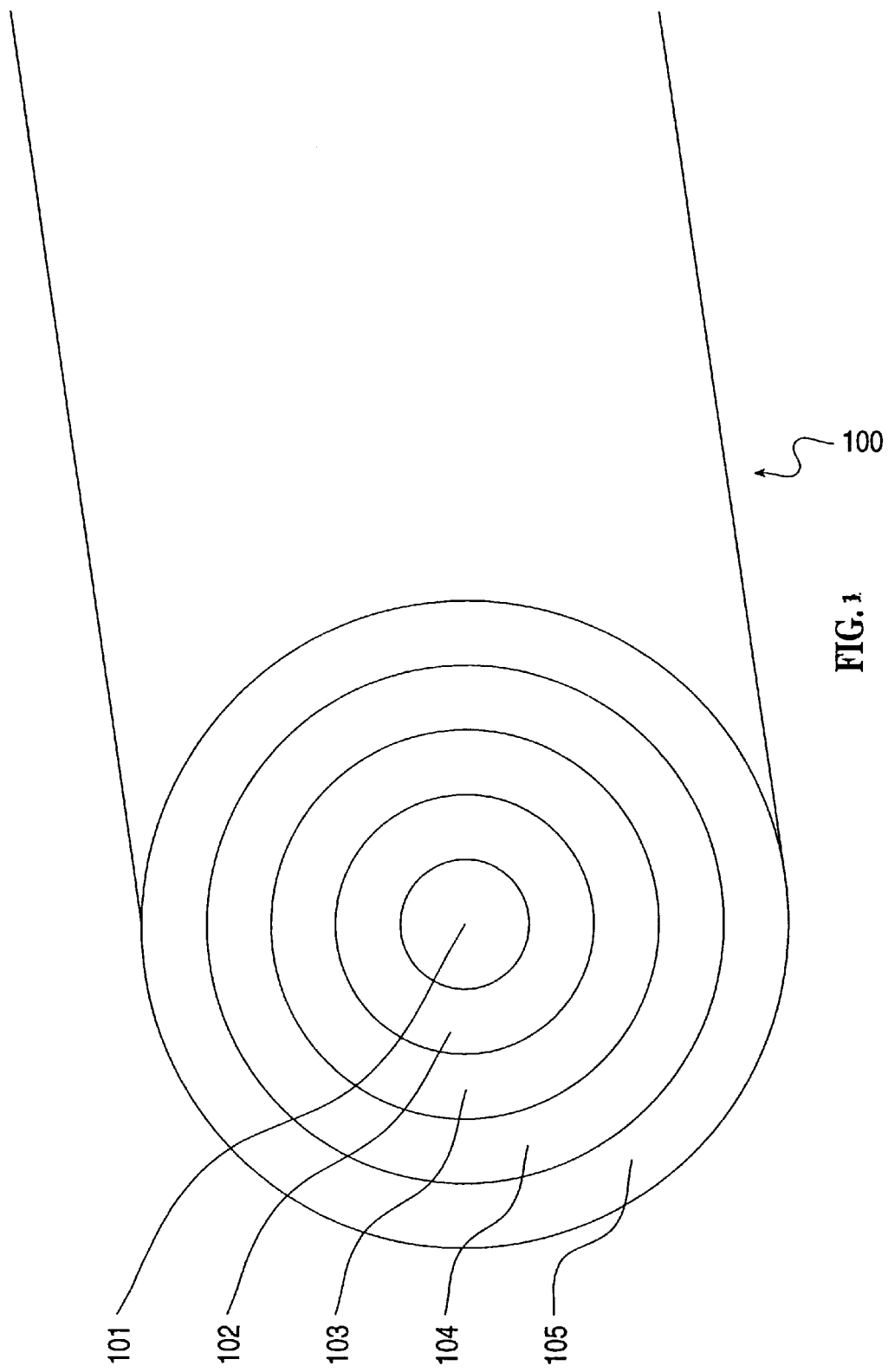
FIG. 1 is a cross sectional view of a fiber optic cable with a radially decreasing index of refraction.

Referring now to the drawings, FIG. 1 shows a cross-sectional view of one preferred embodiment of a fiber optic cable 100 of the present invention. Cable 100 consists of a cylindrical core 101 surrounded by three annular claddings 102, 103, and 104, and a protective plastic sheath 105. Core 101 is made of a silver halide with the formula $AgCl_xBr_{1-x}$. Cladding 102 is made of a silver halide with the formula $AgCl_yBr_{1-y}$. Cladding 103 is made of a silver halide with the formula $AgCl_zBr_{1-z}$. Cladding 104 is made of a silver halide with the formula $AgCl_wBr_{1-w}$. x<y<z<w, so that the index of refraction of core 101 is higher than the index of refraction of cladding 102, the index of refraction of cladding 102 is higher than the index of refraction of cladding 103, and the index of refraction of cladding 103 is higher than the index of refraction of cladding 104.

Mixed silver halide single crystals, of the composition $AgCl_xBr_{1-x}$, are grown from the melt by the Bridgman-Stockbarger technique, which is well-known to those skilled in the art. The fibers are fabricated by extrusion of the single crystal. Extrusion is a process by which the crystal is reduced in cross section by forcing it to flow through a die under pressure. The fiber has a polycrystalline structure, i. e., it is constructed from many small crystals, in contrast to the initial single crystal from which it was extruded.

Only core fiber 101 is fabricated by extrusion of a single crystal. Core clad step index fiber 100 is fabricated by extrusion of a "rod in a tube". The preform is prepared from a polished rod of core material inserted in one or more (three in the case of FIG. 1) hollow cladding cylinders of successively lower bromine concentration.

Figure 2:
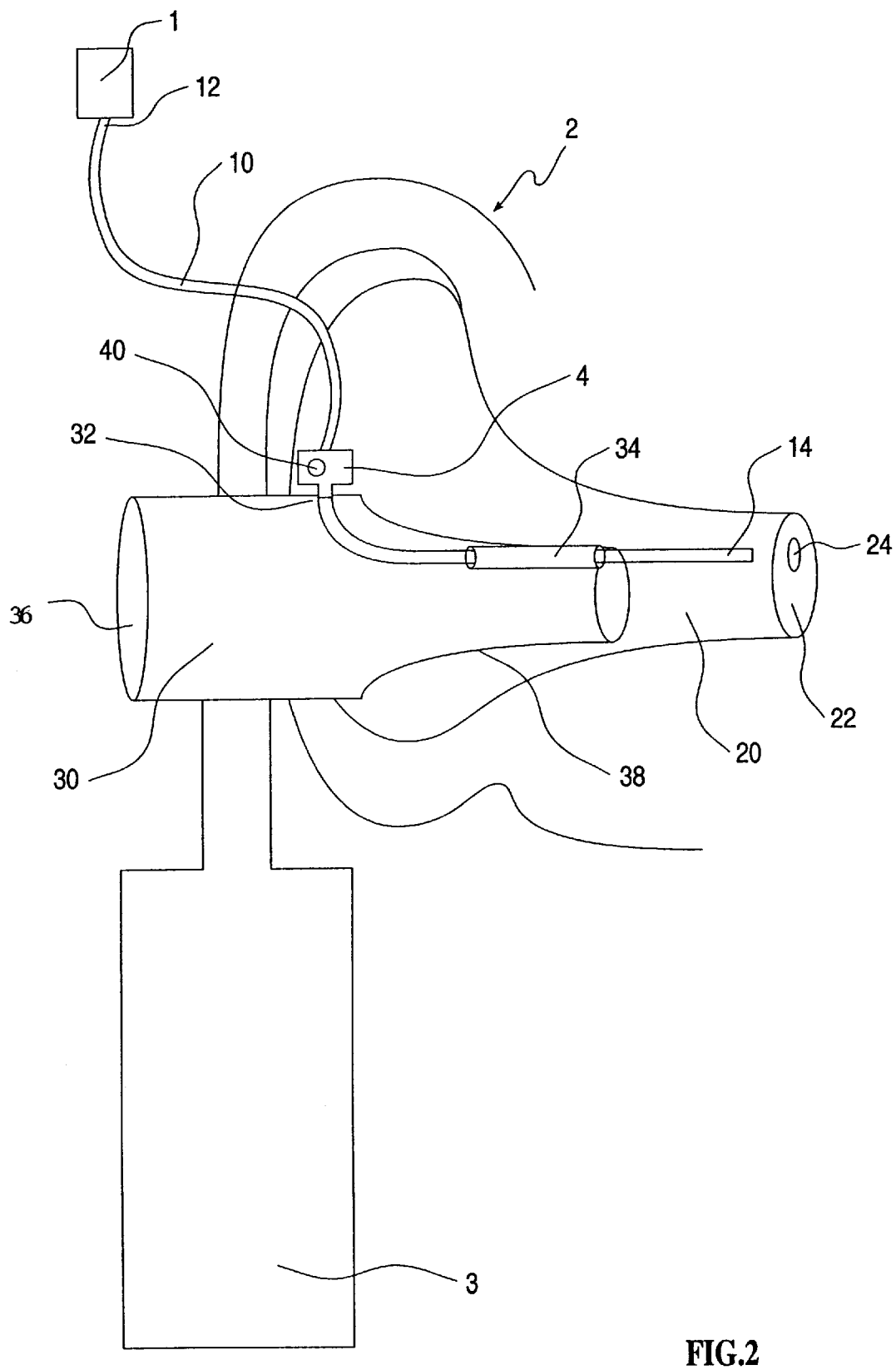
FIG. 2 is a schematic diagram of a fiber optic cable inserted into an otoscope and with its distal end positioned near a tympanic membrane.

FIG. 2 shows a preferred embodiment of the device of the present invention in which distal end 14 of a fiber optic cable 10 is positioned near a target with the help of a suitable optical instrument. In this example, the target is a tympanic membrane 22 of an ear 2 of a patient, and the optical instrument is an otoscope 3. A specially modified speculum 30 of otoscope 3 has a port 32 and a tubular guide 34 to facilitate the positioning of distal end 14 of cable 10 near tympanic membrane 22. Distal end 14 of cable 10 is inserted through positioning device 4, port 32, and tubular guide 34. Proximal end 12 of cable 10 is positioned so as to convey infrared radiation from tympanic membrane 22 to a mid-range infrared sensor in radiometer 1 for the purpose of measuring the temperature of tympanic membrane 22.

A physician who wishes to measure the core body temperature of the patient inserts insertion cone 38 of speculum 30 into ear canal 20 and rotates knob 40 of positioning device 4 to position distal end 14 of cable 10 close enough to tympanic membrane 22 to resolve the temperature of only a portion 24 of tympanic membrane 22. As long as sampled area 24 is smaller than the area of tympanic membrane 22, and assuming that tympanic membrane 22 has a uniform temperature distribution, the temperature measurement is independent of the distance of distal end 14 from tympanic membrane 22. The physician monitors the position of distal end 14 of cable 10 relative to tympanic membrane 22 by looking through lens 36, thereby making sure that distal end 14 of cable 10 does not damage tympanic membrane 22.

Figure 3:
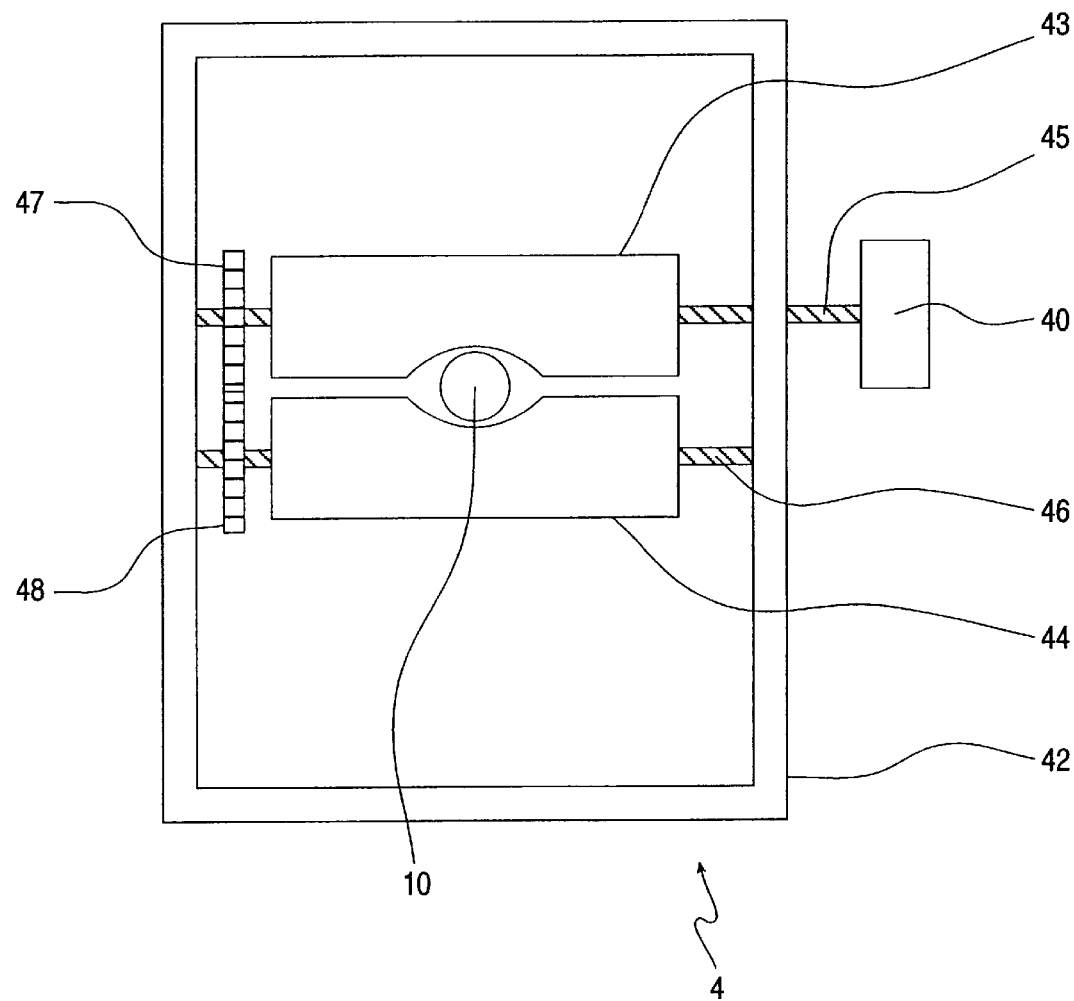
FIG. 3 is a top view of the positioning device of FIG. 2.
Figure 4:
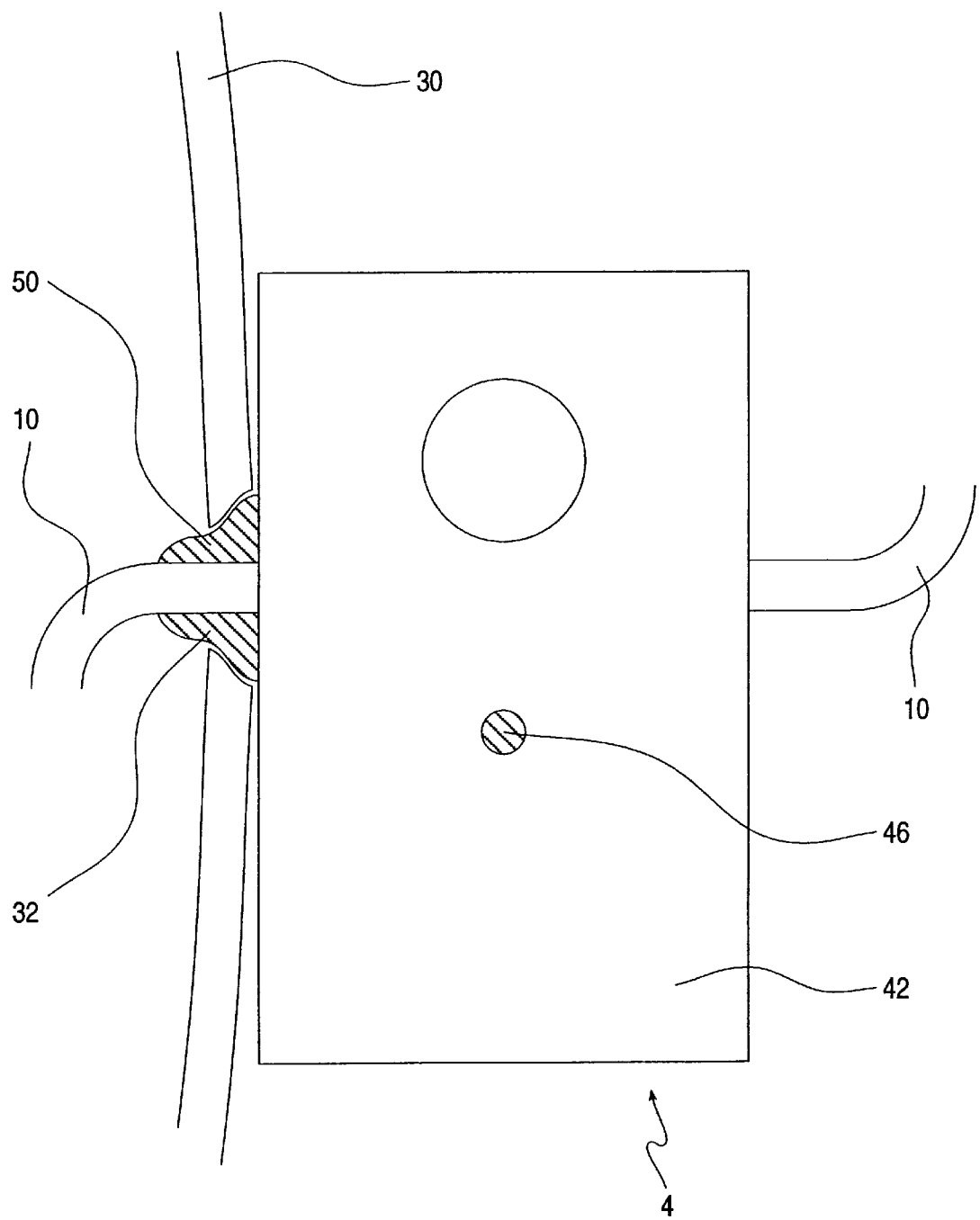
FIG. 4 is a side view of the positioning device of FIG. 2.

FIGS. 3 and 4 are, respectively, top and side views of positioning device 4. Cylindrical shafts 45 and 46 are rotatably inserted between the sides of housing 42. Rigidly attached to, and concentric with, shaft 45, are a roller 43 and a gear wheel 47. Rigidly attached to, and concentric with, shaft 46, are a roller 44 and a gear wheel 48. The diameters of rollers 43 and 44, and the spacing of shafts 45 and 46, are such that rollers 43 and 44 are in contact with each other.

The diameters of gear wheels 47 and 48 are such that gear wheels 47 and 48 engage each other. One end of shaft 45 extends outside housing 42 and is terminated by knob 40. Rollers 43 and 44 are made of a suitably soft material, such as rubber, which deforms to accommodate optic fiber cable 10 between rollers 43 and 44, and which frictionally engages cable 10, so that cable 10 may be moved longitudinally through positioning device 4 by rotating knob 40: when knob 40 is rotated, gear wheels 47 and 48 force rollers 43 and 44 to rotate in opposite directions. Cable 10 is inserted between rollers 43 and 44, and through a nipple 50 in the base of housing 42. Nipple 50 fits into port 32 of speculum 30.

Figure 5:
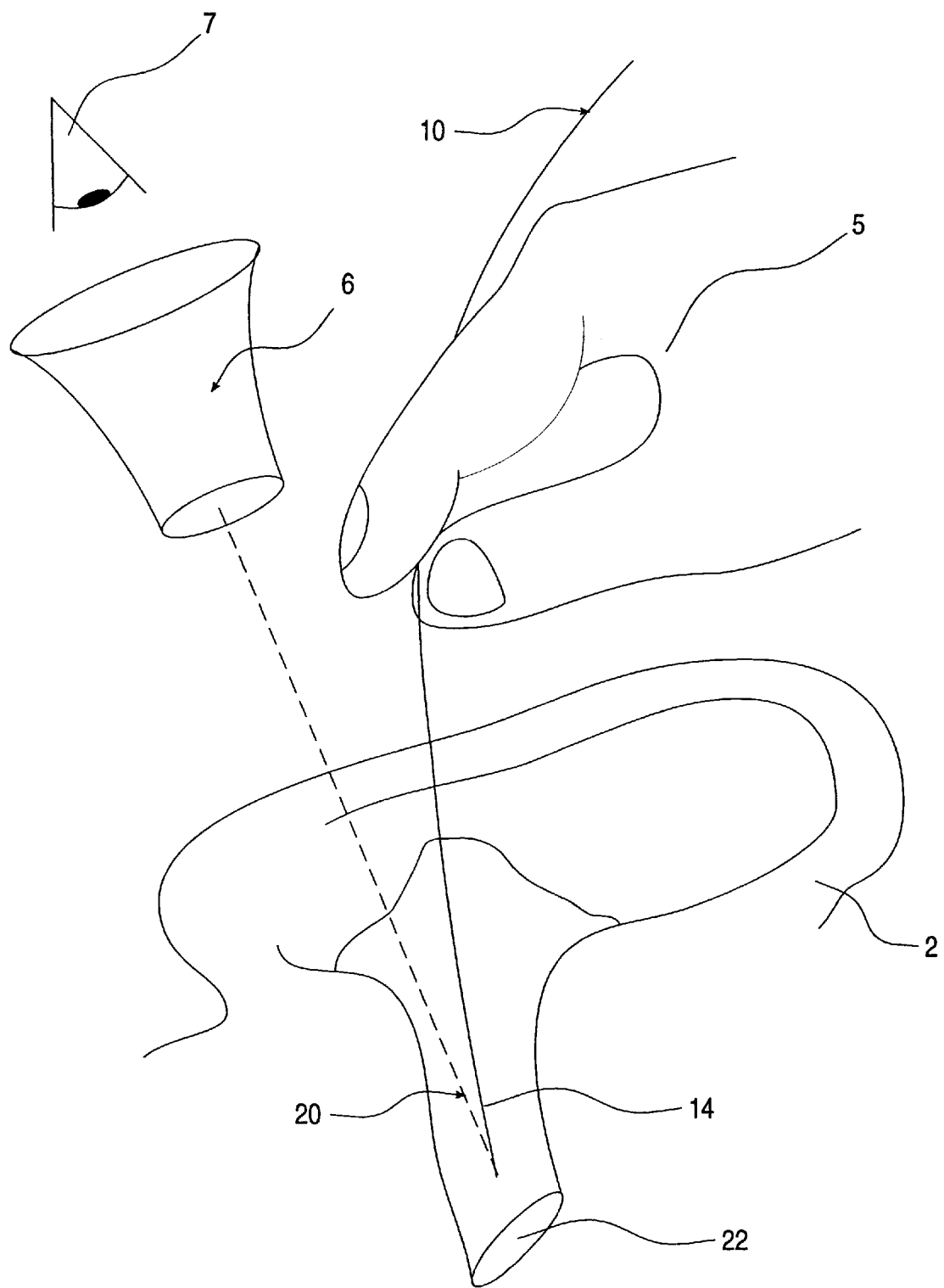
FIG. 5 is a schematic diagram of the use of a fiber optic cable in conjunction with an otomicroscope to measure the temperature of a tympanic membrane.

The scope of the method of the present invention includes measurement of the temperature of tympanic membrane 22 without the insertion of a portion of an optical instrument, such as insertion cone 38 of otoscope 3, into ear canal 20. FIG. 5 is a schematic diagram of a true non-contact temperature measurement by the method of the present invention, such as is advantageous if ear 2 is infected and any contact with ear canal 20 causes substantial pain. A physician holds fiber 10 using a hand 5 while observing the position of distal end 14 of fiber 10 relative to tympanic membrane 22 via an otomicroscope 6, using an eye 7. The physician moves fiber 10 by moving hand 5 to position distal end 14 within a few millimeters of tympanic membrane 22.

While the invention has been described with respect to a limited number of embodiments, it will be appreciated that many variations, modifications and other applications of the invention may be made.

What is claimed is:

1. A method for measuring a temperature of a tympanic membrane within an ear canal, comprising the steps of:

(a) inserting a distal end of a fiber optic cable into the ear canal, said fiber optic cable being inserted through a port of a speculum of an otoscope, such that said distal end of said fiber optic cable is within said speculum, said otoscope being provided with a plurality of contrarotating cylinders, rotatably attached to said otoscope, for moving said fiber optic cable longitudinally in said port, said fiber optic cable being inserted between said cylinders; and (b) positioning said distal end of said fiber optic cable sufficiently close to the tympanic membrane that infrared radiation enters said distal end substantially only from the tympanic membrane.

2. The method of claim 1, wherein a proximal end of said fiber optic cable is optically coupled to a mid-range infrared sensor.

3. The method of claim 1, wherein said fiber optic cable is made of at least one material having a radially decreasing index of refraction with respect to transmission of mid-range infrared radiation.

4. The method of claim 3, wherein said at least one material includes at least one silver halide.

5. The method of claim 4, wherein said fiber optic cable further includes:

(a) a core composed of said at least one material including at least a first silver halide; and (b) at least one cladding, surrounding said core, said at least one cladding being composed of said at least one material including at least a second silver halide.

6. The method of claim 1, wherein said positioning is done using an otomicroscope.

7. The method of claim 1, wherein said fiber optic cable includes a hollow waveguide.

* * * * *